(12) United States Patent
Esaki

(10) Patent No.: US 11,656,818 B2
(45) Date of Patent: May 23, 2023

(54) INFORMATION PROCESSING APPARATUS, INFORMATION PROCESSING METHOD AND STORAGE MEDIUM

(71) Applicant: RISO KAGAKU CORPORATION, Tokyo (JP)

(72) Inventor: Yasuhiro Esaki, Tsukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 17/539,782

(22) Filed: Dec. 1, 2021

(65) Prior Publication Data

US 2022/0188045 A1 Jun. 16, 2022

(30) Foreign Application Priority Data

Dec. 16, 2020 (JP) .............................. JP2020-208402
Sep. 9, 2021 (JP) .............................. JP2021-146723

(51) Int. Cl.
*G06F 3/12* (2006.01)

(52) U.S. Cl.
CPC ............ *G06F 3/124* (2013.01); *G06F 3/1205* (2013.01); *G06F 3/125* (2013.01); *G06F 3/1258* (2013.01)

(58) Field of Classification Search
CPC combination set(s) only.
See application file for complete search history.

(56) References Cited

U.S. PATENT DOCUMENTS

| 6,988,839 | B1 * | 1/2006 | Yu | .......................... B41J 11/485 400/70 |
| 2003/0051625 | A1 | 3/2003 | Miyazato | |
| 2012/0003023 | A1 * | 1/2012 | Igarashi | ............... G03G 15/655 399/382 |
| 2012/0201549 | A1 * | 8/2012 | Sakata | ............... G03G 15/6591 399/16 |
| 2016/0085492 | A1 * | 3/2016 | Li | .......................... G06F 3/1208 358/1.13 |
| 2018/0203646 | A1 | 7/2018 | Takahashi et al. | |
| 2018/0373469 | A1 * | 12/2018 | Soriano | .................. G03G 15/55 |
| 2019/0317714 | A1 * | 10/2019 | Fukui | .................... G06F 3/1205 |

FOREIGN PATENT DOCUMENTS

| JP | 2001-247253 | 9/2001 |
| JP | 2003-091390 | 3/2003 |

OTHER PUBLICATIONS

Aboujaoude, J. F., "Programmable Pattern of Paper-Tray Alternation," Xerox Disclosure Journal, Xerox Corporation, Stamford, Connecticut, U.S.A, vol. 18, No. 6, Nov. 1, 1993, pp. 579-582, XP000414740.
May 19, 2022 Extended European Search Report in European Application No. 21213165.0.

* cited by examiner

*Primary Examiner* — Helen Zong
(74) *Attorney, Agent, or Firm* — Greenblum & Bernstein, P.L.C.

(57) ABSTRACT

An information processing apparatus including a controller configured to receive selection of a medium feeder corresponding to a page number from among a plurality of medium feeders that feed a medium; and to regard a page range of the page numbers that have been received as a cycle pattern and to repeatedly apply the cycle pattern to page numbers beyond the page range, to set, as the medium feeders corresponding the page numbers beyond the page range, the medium feeders corresponding to the page numbers in the cycle pattern.

6 Claims, 9 Drawing Sheets

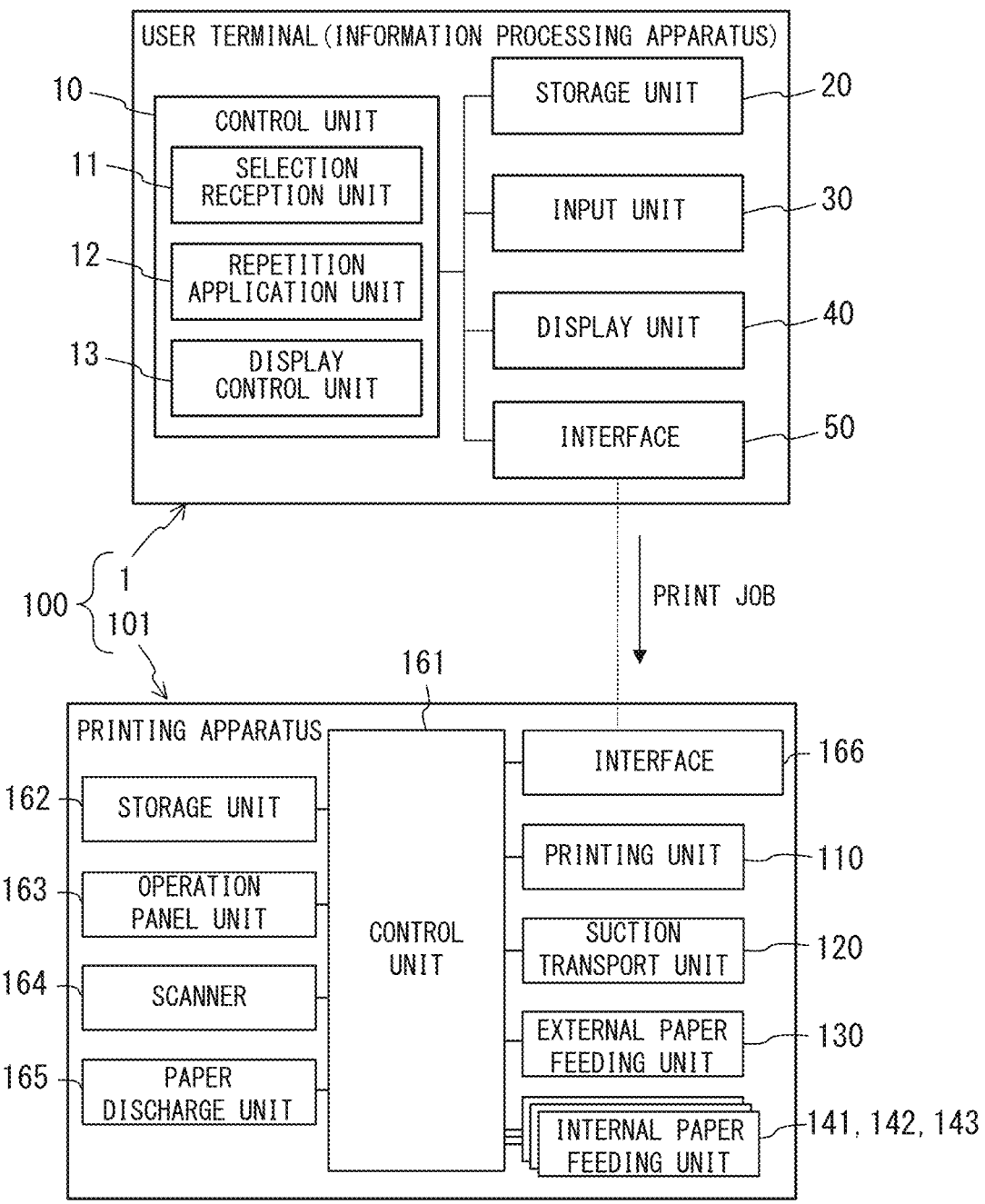
F I G. 1

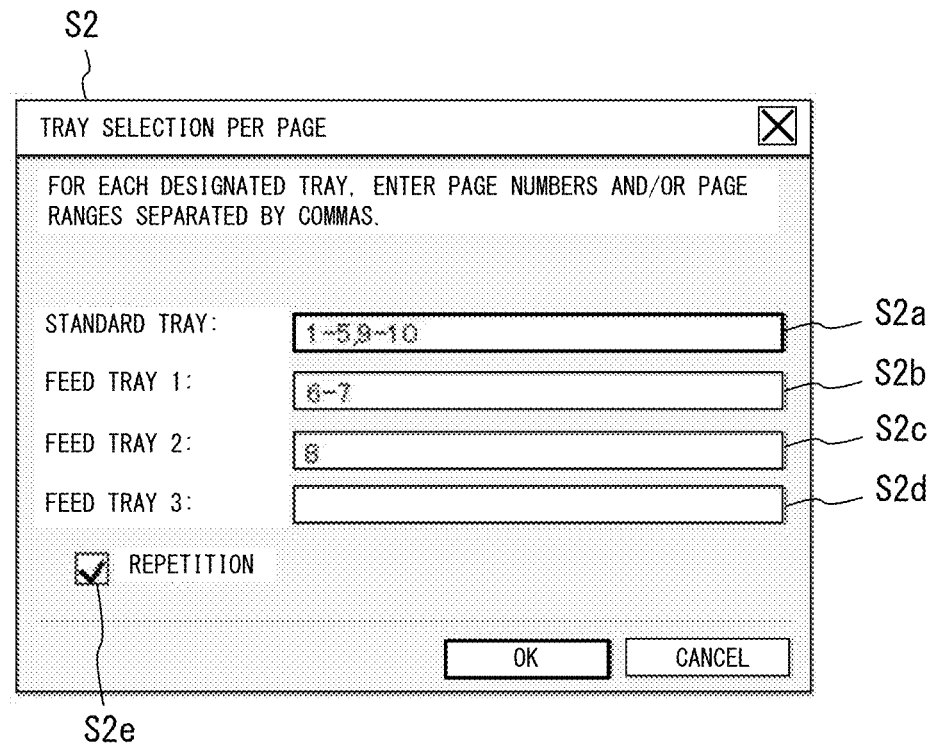
F I G. 4 A

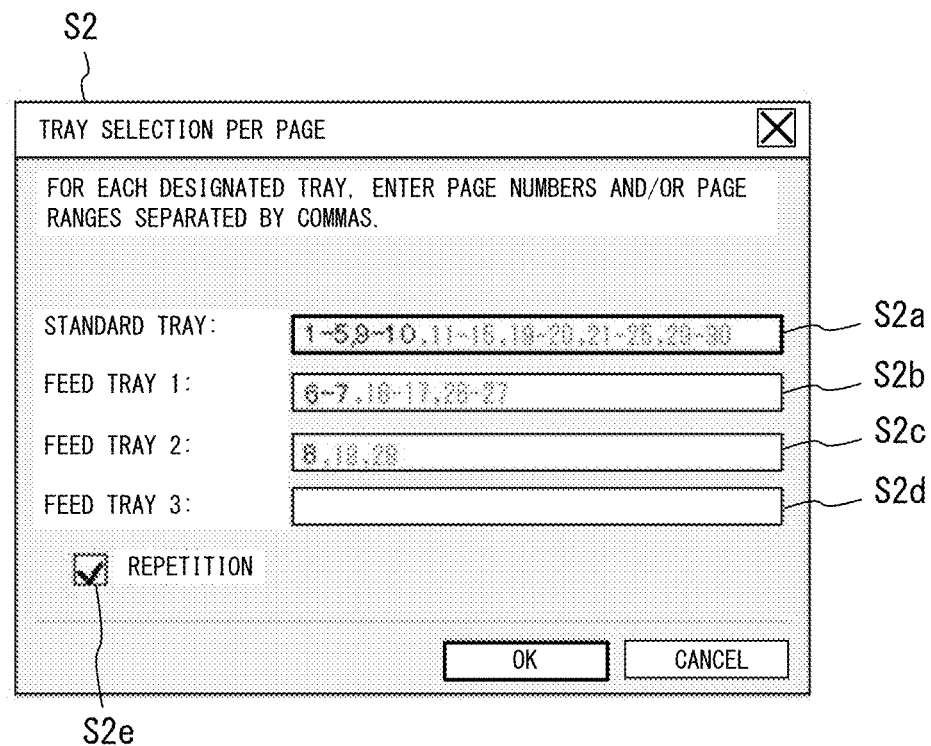
F I G. 4 C

|  | CYCLE 0 | CYCLE 1 | CYCLE 2 | CYCLE n(A=10) |
|---|---|---|---|---|
| STANDARD TRAY | 1-5, 9-10 | 11-15, 19-20 | 21-25, 29-30 | (1+An) to (5+An), (9+An) to (10+An) |
| FEED TRAY 1 | 6-7 | 16-17 | 26-27 | (6+An) to (7+An) |
| FEED TRAY 2 | 8 | 18 | 28 | (8+An) |

F I G. 5

INFORMATION PROCESSING APPARATUS, INFORMATION PROCESSING METHOD AND STORAGE MEDIUM

CROSS-REFERENCE TO RELATED APPLICATION

This application is based upon and claims the benefit of priority of the prior Japanese Patent Application No. 2020-208402, filed on Dec. 16, 2020 and the prior Japanese Patent Application No. 2021-146723 filed on Sep. 9, 2021, the entire contents of which are incorporated herein by reference.

FIELD

The embodiments discussed herein are related to an information processing apparatus, an information processing method, and a storage medium for receiving selection of medium feeders corresponding to page numbers.

BACKGROUND

Conventionally, among information processing apparatuses such as user terminals that perform print setting for a printing apparatus, there have been information processing apparatuses that receive selection of a medium feeding unit that corresponds to a pager number from a plurality of medium feeding units that feed a medium such as paper.

Among such information processing apparatuses, an information processing apparatus has been proposed that makes it possible to select a combination of paper feeding units that feed a plurality of types of paper to be inserted into a printed document (for example, see Japanese Laid-open Patent Publication No. 2003-091390).

SUMMARY

According to an aspect, an information processing apparatus including a controller configured to receive selection of a medium feeder corresponding to a page number from among a plurality of medium feeders that feed a medium; and to regard a page range of the page numbers that have been received as a cycle pattern and to repeatedly apply the cycle pattern to page numbers beyond the page range, to set, as the medium feeders corresponding to the page numbers beyond the page range, the medium feeders corresponding to the page numbers in the cycle pattern.

The object and advantages of the invention will be realized and attained by means of the elements and combinations particularly pointed out in the claims.

BRIEF DESCRIPTION OF DRAWINGS

FIG. 1 is a configuration diagram illustrating a printing system according to an embodiment;
FIG. 4A is an example (Part 1) of a tray selection window according to an embodiment;
FIG. 4C is an example (Part 3) of a tray selection window according to an embodiment;
FIG. 5 is a table for explaining repeated application of a cycle pattern according to an embodiment.

DESCRIPTION OF EMBODIMENTS

Figure 2:
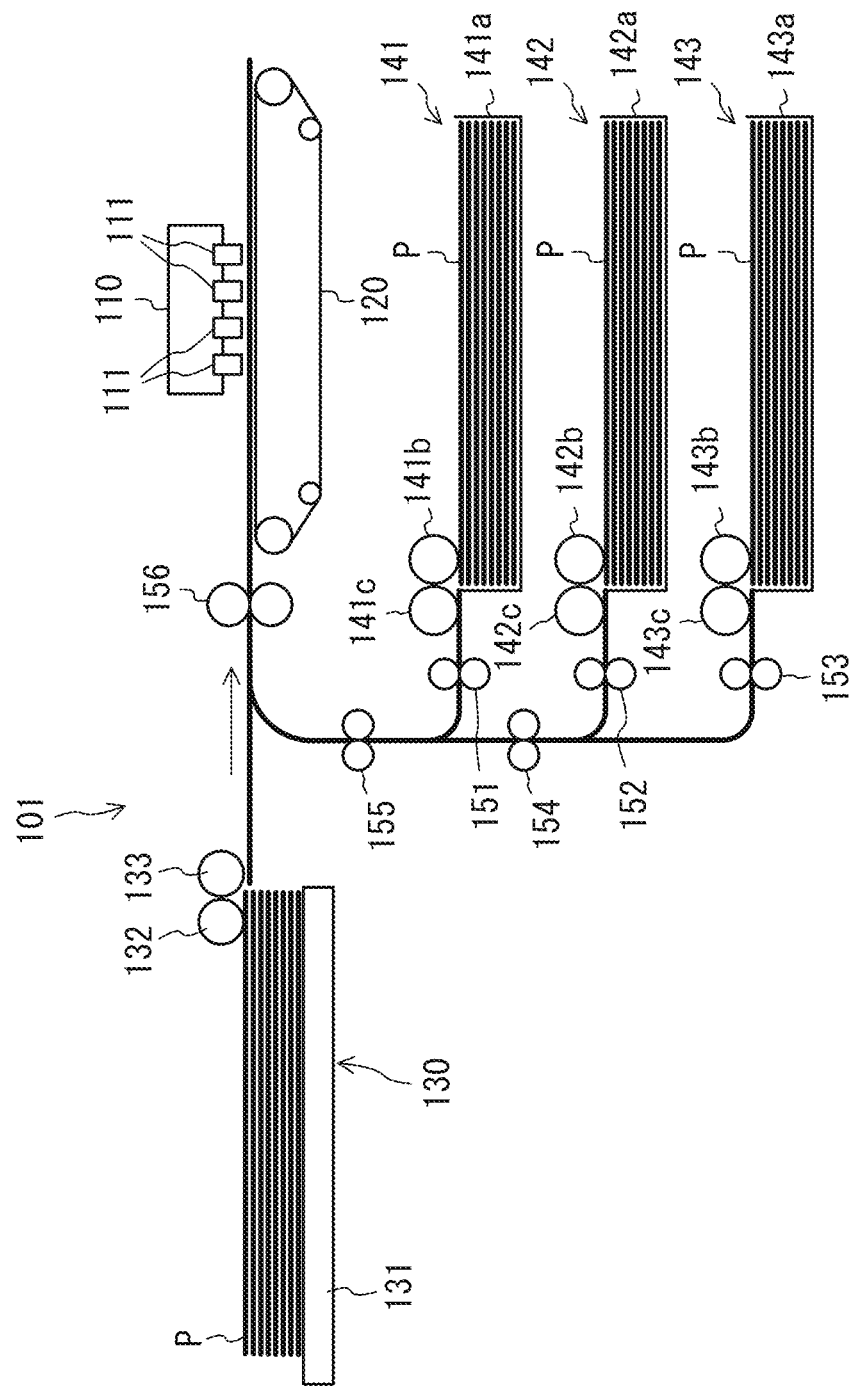
FIG. 2 is a diagram illustrating the internal structure of a printing system according to an embodiment.

In the art disclosed in the above patent document, the front cover, back cover, inserting paper, index paper, and so on are supplied from different paper feeding units, and the combination is selected from preset patterns.

Meanwhile, a user may want to print some pages of a document consisting of multiple pages on special paper (colored paper, a standard form, and so on). In such cases, printing is possible as long as a plurality of types of media are stored in a plurality of medium feeding units and the printed material may be selected from preset patterns mentioned above. However, in the conventional art described above, the patterns that can be preset are limited, and the degree of freedom in selecting medium feeding units is limited.

As one way to freely select medium feeding units, the medium feeding unit may be designated for each page. For example, in the case in which the user wants to print the first and second pages of a five-page handout on colored paper and the other pages on white paper, and if tray 1 is loaded with colored paper and tray 2 is loaded with white paper, the user may select tray 1 for pages 1 and 2 and tray 2 for pages 3 through 5 on a tray selection window.

However, when performing variable printing with a plurality of pages being one set for a large number of people, for example 1,000 people, it is necessary to repeat the selection of medium feeding units corresponding to the pattern of multiple pages many times. In the above example of a handout consisting of five pages, pages 1, 2, 6, 7, 11, 12, . . . are entered for tray 1, pages 3-5, 8-10, 13-15, . . . are entered for tray 2, and so on. As a result, the number of characters to be entered becomes huge, making the input process inefficient and creating the risk of incorrect input.

Hereinafter, an information processing apparatus, an information processing method, and a program according to embodiments of the present invention will be explained with reference to drawings.

FIG. 1 is a configuration diagram illustrating a printing system 100 according to an embodiment.

As illustrated in FIG. 1, the printing system 100 is equipped with a user terminal 1 that is an example of an information processing apparatus and a printing apparatus 101.

The user terminal 1 is equipped with a control unit 10, a storage unit 20, an input unit 30, a display unit 40, and an interface 50. The user terminal 1 may be, for example, a stationary terminal such as a desktop computer, or may be a portable terminal such as a tablet, a smart phone, a laptop computer and the like.

The control unit (controller) 10 has, for example, a processor (for example, a CPU: Central Processing Unit) that functions as an arithmetic processing unit to control the operation of the entire user terminal 1. This processor functions as a selection reception unit 11, a repetition application unit 12, and a display control unit 13 by reading and executing a prescribed program from a storage unit 20 or a non-transitory storage medium. control unit 13. Meanwhile, at least one of the selection reception unit 11, the repetition application unit 12, and the display control unit 13 may be arranged as an independent unit (for example, a processor).

While the selection reception unit 11 and the repetition application unit 12 will be described in detail later, the selection reception unit 11 receives the selection of a standard tray 131 or internal paper feeding units 141, 142, 143 that corresponds to a page number, from the standard tray 131 or the internal paper feeding units 141, 142, 143 illustrated in FIG. 2 that feed paper P, an example of the medium.

The repetition application unit 12 regards the page range of the page numbers received by the selection reception unit 11 as a cycle pattern and repeatedly applies the cycle pattern to page numbers beyond the page range and sets, as the standard tray 131 or the internal paper feeding units 141, 142, 143 that corresponds to the page numbers beyond the page range, the standard tray 131 or the internal paper feeding units 141, 142, 143 that corresponds to the page numbers in the cycle pattern.

The display control unit 13 performs display control to display, on the display unit 40, a print setting window S1 illustrated in FIG. 3 and a tray selection window S2 illustrated in FIGS. 4A through 4C, and so on, which will be described later.

The storage unit 20 has a memory, a hard disk device, and the like such as, for example, a ROM (Read Only Memory) that is a read-only semiconductor memory that stores a prescribed program read from a non-transitory storage medium or acquired via the Internet, and a RAM (Random Access Memory) that is a semiconductor memory that is writable and readable at any time and used as a working storage area when the processor of the control unit 10 executes various programs.

The input unit 30 is, for example, a keyboard device, a mouse device, a touch panel, or the like, and accepts input of various operational information from the user.

The display unit 40 is a display that displays various information such as display windows for user input operations. For example, the display unit 40 displays the print setting window S1 in FIG. 3, the tray selection window S2 in FIGS. 4A through 4C, and so on, according to the display control of the display control unit 13. Meanwhile, a display that has a touch panel may function as the input unit 30 and the display unit 40.

The interface 50 exchanges various information with other apparatuses such as the printing apparatus 101. For example, the interface 50 sends a print job to the printing apparatus 101 (an interface 166) that is connected wirelessly or wired.

As illustrated in FIG. 2, the printing apparatus 101 is equipped with a printing unit 110, a suction transport unit 120, an external paper feeding unit 130, internal paper feeding units 141 through 143, transport roller pairs 151 through 155 and a resist roller pair 156. In addition, as illustrated in FIG. 1, the printing apparatus 101 is further equipped with a control unit 161, a storage unit 162, an operation panel unit 163, a scanner 164, a paper discharge unit 165, and an interface 166. Meanwhile, in FIG. 2, the transport paths extending from the external paper feeding unit 130 and the internal paper feeding unit 141 through 143 to the printing unit 110 are indicated with thick solid lines.

The printing unit 110 illustrated in FIG. 2 has a plurality of inkjet printheads 111 that are, for example, line-type inkjet printheads. The printing unit 110 prints on a medium such as paper P according to a print job including image data sent from the user terminal 1. The printing method of the printing unit 110 is, for example, inkjet printing method, stencil printing method, electrophotographic method, and so on, while there are no particular limitations.

The suction transport unit 120 is arranged to face the printing unit 110. For example, the suction transport unit 120 transports the paper P by means of a transport belt while sucking the paper P.

The external paper feeding unit 130 and the internal paper feeding units 141 through 143 are examples of the medium feeding units (medium feeders) that feed paper P (medium) and have the standard tray 131 or trays 141a, 142a, 143a, scraper rollers 132, 141b, 142b, 143b, and pickup rollers 133, 141c, 142c, 143c.

The standard tray 131 and the trays 141a, 142a, 143a are loaded with a plurality of sheets of paper P. The standard tray 131 and the trays 141a, 142a, 143a may also be loaded with a medium other than paper P, such as envelopes and forms. In addition, the standard tray 131 and the trays 141a, 142a, 143a are loaded with two or more types of media with different types (for example, media types such as paper P, envelopes, and forms, size types such as A4 and A3, and color types such as white and red).

The scraper rollers 132, 141b, 142b, 143b are feed rollers that feed forward and transport the paper P located at the top of the plurality of sheets of paper P loaded on the standard tray 131 or trays 141a, 142a, 143a.

The pickup rollers 133, 141c, 142c, 143c transport the paper P that has been fed forward by the scraper rollers 132, 141b, 142b, 143b.

The transport roller pairs 151 through 155 are located in the transport paths from the internal paper feeding unit 141 through 143 to the resist roller pair 156.

Paper P transported from the external paper feeding unit 130 and the internal paper feeding units 141 through 143 is pushed against the resist roller pair 156. Accordingly, the skew of the paper P is corrected.

The control unit 161 illustrated in FIG. 1 has a processor (for example, a CPU) that functions as an arithmetic processing unit to control the operation of the entire printing apparatus 101 and controls the operation of each unit of the printing apparatus 101.

The storage unit 162 has a memory, a hard disk device, and the like, such as, for example, a ROM that is a read-only semiconductor memory in which a prescribed control program is recorded in advance, and a RAM that is a semiconductor memory that is writable and readable at any time and is used as a working storage area as necessary when the processor executes various control programs.

The operation panel unit 163 functions as an example of the input unit and the display unit (display) of the printing apparatus 101 by having, for example, operation keys for various operations, a touch panel, and a display that displays various information, and so on.

The scanner 164 reads image data from an original document.

The paper discharge unit 165 that is not illustrated in FIG. 2 has a paper discharge tray on which the paper P printed by the printing unit 110 is loaded and a discharge roller that discharges the paper P into the paper discharge tray.

The interface 166 exchanges various information with other apparatuses such as the user terminal 1. For example, the interface 166 receives print jobs from the user terminal 1 (the interface 50) that is connected wirelessly or wired.

Figure 3:
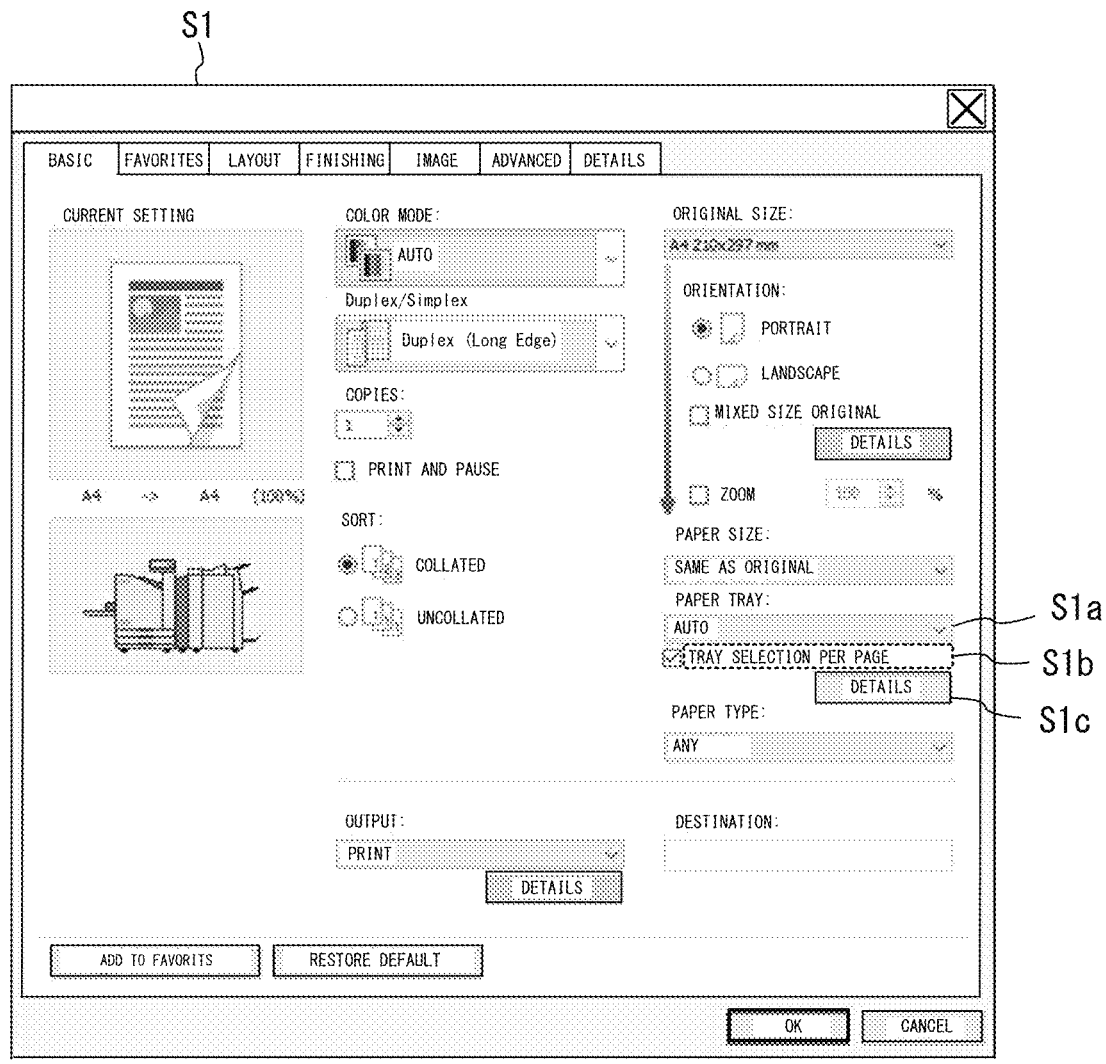
FIG. 3 is an example of a print setting window according to an embodiment.

FIG. 3 is an example of the print setting window S1.

Figure 4B:
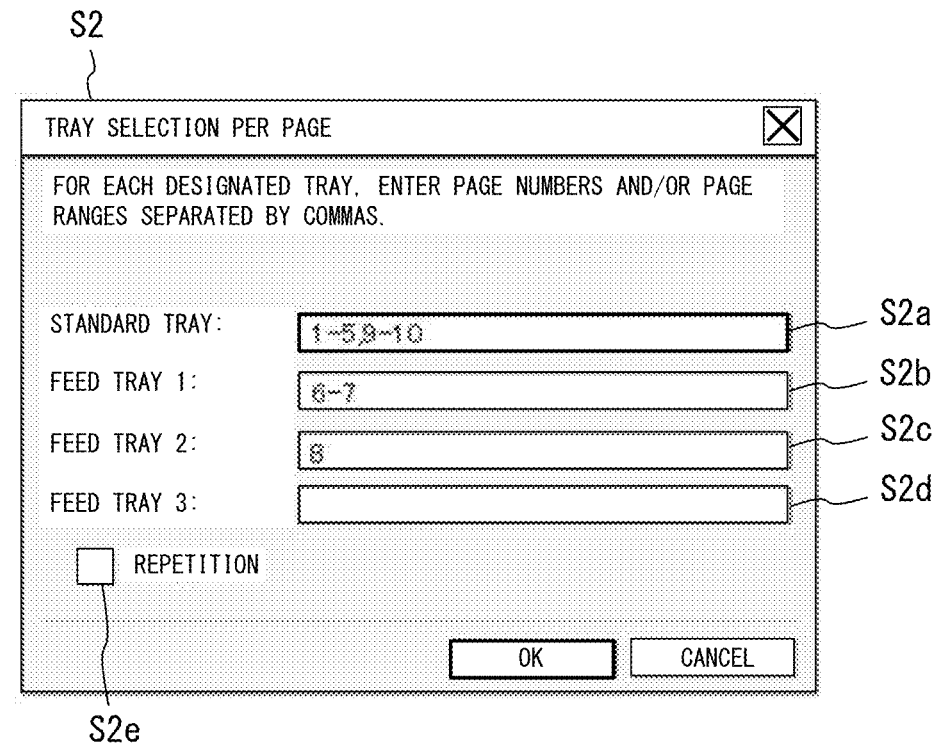
FIG. 4B is an example (Part 2) of a tray selection window according to an embodiment.

FIG. 4A through FIG. 4C are examples of the tray selection window S2.

FIG. 5 is a table for explaining repeated application of a cycle pattern.

The display unit 40 of the user terminal 1 illustrated in FIG. 1 displays the print setting window S1 in FIG. 3 according to the display control of the display control unit 13.

On the print setting window S1, the user makes various settings such as color mode setting for color printing or black-and-white printing, printing side setting for single-sided printing or double-sided printing, print size setting, print orientation setting, and so on. The print settings thus set are obtained by the control unit 10 and sent to the printing apparatus 101 by the interface 166 as a print job.

The print setting window S1 has a tray selection section S1a that is located where "Paper Tray:" is displayed.

In this tray selection section S1a, either the external paper feeding unit 130 (the standard tray 131) or the internal paper feeding units 141, 142, 143 (trays 141a, 142a, 143a) may be selected, and in addition to that, "Auto" may also be selected for following a predetermined setting. Here, as described above, the standard tray 131 and the trays 141a, 142a, 143a may be loaded with two or more types of media of different types.

Below the tray selection section S1a, there is a page-by-page setting check box S1b locate where "TRAY SELECTION PER PAGE" is displayed. When the user clicks on the detailed setting button S1c with this page-by-page setting check box S1b checked, the display control unit 13 displays the tray selection window S2 in FIG. 4A through FIG. 4C on the display unit 40.

In the tray selection window S2 in FIG. 4A through FIG. 4C, the external paper feeding unit 130 (the standard tray 131) is regarded as "Standard Tray", the internal paper feeding unit 141 (tray 141a) as "Tray 1", the internal paper feeding unit 142 (tray 142a) as "Tray 2", and the internal paper feeding unit 143 (tray 143a) as "Tray 3", and a tray corresponding to a page number may be selected from among these plurality of trays (the standard tray and Trays 1 through 3 are referred to as a "tray").

Specifically, the selection reception unit 11 illustrated in FIG. 1 receives the selection of a tray corresponding to a page number, by the input of the page number being made in any of the standard tray page number input field S2a that is located where "Standard Tray:" is displayed; the tray 1 page number input field S2b that is located where "Tray 1:" is displayed; the tray 2 page number input field S2c that is located where "Tray 2:" is displayed; and the tray 3 page number input field S2d that is located where "Tray 3:" is displayed. Meanwhile, the standard tray page number input field S2a, tray 1 page number input field S2b, tray 2 page number input field S2c, and tray 3 page number input field S2d are examples of page selection means for selecting a page corresponding to a tray.

For example, in the examples of FIGS. 4a and 4b, '7 1-5, 9-10" (pages 1-5 and 9-10) are input in the standard tray page number input field S2a, '7 6-7" (pages 6-7) is input in the tray 1 page number entry field S2a, and "8" (page 8) is input in the tray 2 page number entry field S2c.

In this case, the repetition application unit 12 illustrated in FIG. 1 regards the page range of the page numbers received by the selection reception unit 11 (10 being the largest page number is assumed as A) as a cycle pattern (CYCLE 0 in FIG. 5), and applies the cycle pattern repeatedly until the total number of pages of the paper P (document) to be supplied reaches the upper limit, such as CYCLE 1 (pages 11-20), CYCLE 2 (pages 21-30), . . . , CYCLE n (pages An+1 through An+A). Specifically, the repetition application unit 12 performs a process of adding, to the input value, the largest value (A) of the input values (page numbers) multiplied by the number of cycles (n) and repeating it, counting up the cycle number from 0 by 1. Meanwhile, the number of pages per cycle is constant, but some variable data may be changed for the print content per cycle.

In addition, the repetition application unit 12 sets the tray corresponding to the page numbers (in the order of pages in cycle) in CYCLE 0 to be the tray corresponding to the page numbers in CYCLE 1, 2. For example, as illustrated in FIG. 5, in CYCLE 0, the tray corresponding to pages 1-5 and 9-10 is the standard tray, the tray corresponding to pages 6-7 is TRAY 1, and the tray corresponding to page 8 is TRAY 2, so in CYCLE 1, the tray corresponding to pages 11-15 and 19-20 is the standard tray, the tray corresponding to pages 16-17 is TRAY 1, and the tray corresponding to page 18 is TRAY 2. In CYCLE 2, the tray corresponding to pages 21-25 and 29-30 is the standard tray, the tray corresponding to pages 26-27 is TRAY 1, and the tray corresponding to page 28 is TRAY 2.

Then, in CYCLE n, the tray corresponding to pages (1+An) to (5+An) and (9+An) to (10+An) is the standard tray, the tray corresponding to pages (6+An) to (7+An) is TRAY 1, and the tray corresponding to page (8+An) is TRAY 2.

In order for the selection reception unit 11 to receive the repetition setting as to whether or not to repeatedly apply the cycle pattern to page numbers beyond the page range as described, the tray selection window S2 illustrated in FIGS. 4A through 4C has a repetition setting check box S2e where "Repetition" is displayed. It is preferable that only when the user clicks the OK button with repetition setting checkbox S2e checked (see FIG. 4A), the repetition application unit 12 applies the repetition pattern to page numbers beyond the page range as described above. In other words, it is preferable that, when the repetition setting check box S2e is not checked as illustrated in FIG. 4B, the repetition application unit 12 does not repeatedly apply the cycle pattern to page numbers beyond the page range and sets the selected trays only for the pages entered in the paper feed rack page number input field S2a, the tray 1 page number input field S2b, the tray 2 page number input field S2c, and the tray 3 page number input field S2d.

Meanwhile, in the state in which the repetition setting check box S2e is checked, the result of the application of the repetition (that is, the page numbers for the trays set by the repetition application unit 12) may be additionally displayed in the input fields S2a, S2b, S2c, S2d. At this time, the result of the application may be displayed in a manner that clearly distinguishes it from a value (page number) actually input by the user, for example, in a light color, a different color, italics, or brackets. The application result may be displayed in a position different from the value actually entered by the user (for example, in a separately provided application result field), but preferably, it may be displayed in a continuous line in the same position (input field S2a, S2b, S2c, S2d). FIG. 4C is an example of applying repetition to the input examples in FIGS. 4a and 4b and displaying the result of the application in a color lighter than the color of the values actually input by the user, so that they line up consecutively with the values actually input by the user in the input fields S2a, S2b, S2c, S2d. In other words, it is preferable that the display control unit 13 that displays the tray (the medium feeding unit) selection window S2 on the display unit 40 performs display in a manner in which the selected tray and the tray set by the repetition application unit 12 may be distinguished.

Meanwhile, in the above description, the user terminal 1 is described as an example of an information processing apparatus equipped with the selection reception unit 11 and the repetition application unit 12. However, the printing apparatus 101 may be equipped with the selection reception unit and the repetition application unit and may function as an example of an information processing apparatus. In addition, a printing controller installed separately from the printing apparatus 101 may be configured to function as an information processing apparatus. Thus, the information processing apparatus is not limited to the user terminal 1 and may be the printing apparatus 101, the printing controller, or any other apparatus.

In addition, in the above description, the page number of the medium (paper P) is described as the page number for printing, but the medium feeding unit may feed the medium not to the printing apparatus 101 but to a post-processing apparatus that performs post-processing such as enclosing, sealing, stapling, bookbinding, and so on, or other apparatuses.

In the embodiment described above, the user terminal 1 (an example of the information processing apparatus) is equipped with the selection reception unit 11 that receives the selection of the external paper feeding unit 130 or the internal paper feeding units 141, 142, 143 (the standard tray 131 (the standard tray) or the trays 141a, 142a, 143a (trays 1 through 3)) that corresponds to a page number from among the external paper feeding unit 130 and the internal paper feeding units 141, 142, 143 (examples of the plurality of medium feeding units) that feed paper P (an example of the medium), and the repetition application unit 12 that regards the page range of page numbers received by the selection reception unit 11 as a cycle pattern and repeatedly applies the cycle pattern to page numbers beyond the page range, to set, as the external paper feeding unit 130 or the internal paper feeding units 141, 142, 143 corresponding to the page number beyond the page range, the external paper feeding unit 130 or the internal paper feeding units 141, 142, 143 corresponding to a page number in the cycle pattern.

Meanwhile, in another aspect, an information processing method is, for example, an information processing method executed by an information processing apparatus (computer), in which the selection of the external paper feeding unit 130 or the internal paper feeding units 141, 142, 143 (the standard tray 131 (the standard tray) or the trays 141a, 142a, 143a (trays 1 through 3)) that corresponds to a page number from among the external paper feeding unit 130 and the internal paper feeding units 141, 142, 143 (examples of the plurality of medium feeding units) that feed paper P (an example of the medium) is received, and regarding the page range of the received page numbers as a cycle pattern, the cycle pattern is repeatedly applied to page numbers beyond the page range to set, as the external paper feeding unit 130 or the internal paper feeding units 141, 142, 143 corresponding to the page numbers beyond the page range, the external paper feeding unit 130 or the internal paper feeding units 141, 142, 143 corresponding to the page numbers in the cycle pattern.

Meanwhile, in another aspect, a computer (for example, the user terminal 1) may realize a function of receiving the selection of the external paper feeding unit 130 or the internal paper feeding units 141, 142, 143 (the standard tray 131 (the standard tray) or the trays 141a, 142a, 143a (trays 1 through 3)) that corresponds to a page number from among the external paper feeding unit 130 and the internal paper feeding units 141, 142, 143 (examples of the plurality of medium feeding units) that feed paper P (an example of the medium), and a function of regarding the page range of the received page numbers as a cycle pattern and repeatedly applying the cycle pattern to page numbers beyond the page range to set, as the external paper feeding unit 130 or the internal paper feeding units 141, 142, 143 corresponding to the page numbers beyond the page range, the external paper feeding unit 130 or the internal paper feeding units 141, 142, 143 corresponding to the page numbers in the cycle pattern.

Accordingly, it becomes possible to set the medium feeding units corresponding to the page numbers without having to select the medium feeding unit for all pages in the case in which the media are repeatedly fed with multiple pages as a set. Therefore, according to the present embodiment, it becomes easy to select the medium feeding unit for each page. This prevents inefficient input work for page numbers, increased processing load, and input errors due to the large number of characters to be input.

In addition, according to the present embodiment, the selection reception unit 11 receives the repetition setting as to whether or not to repeatedly apply the cycle pattern to page numbers beyond the page range, according to the input in the repetition setting check box S2e, for example, the repetition application unit 12 repeatedly applies the repetition pattern to page numbers beyond the page range in the case in which the repetition setting is made and does not repeatedly apply the repetition pattern to page numbers beyond the page range in the case in which the repetition setting is not made.

Accordingly, it becomes possible to select the medium feeding unit using the cycle pattern only in the case in which it needs to be repeated for each cycle pattern, which prevents the medium feeding unit from being selected unintentionally.

In addition, according to the present embodiment, the user terminal 1 is further equipped with the display control unit 13 that displays, on the display unit 40, the tray selection window S2 for the external paper feeding unit 130 and the internal paper feeding unit 141, 142, 143 (the standard tray and the trays 1 through 3). The display control unit 13 displays, on the display unit 40, the selected external paper feeding unit 130 and internal paper feeding units 141, 142, 143, as well as the external paper feeding unit 130 and internal paper feeding units 141, 142, 143 set by the repetition application unit 12, in a manner in which they are distinguishable from each other.

Accordingly, it becomes possible for the user to easily check how the repetition is applied, which improves the convenience for the user.

Figure 6:
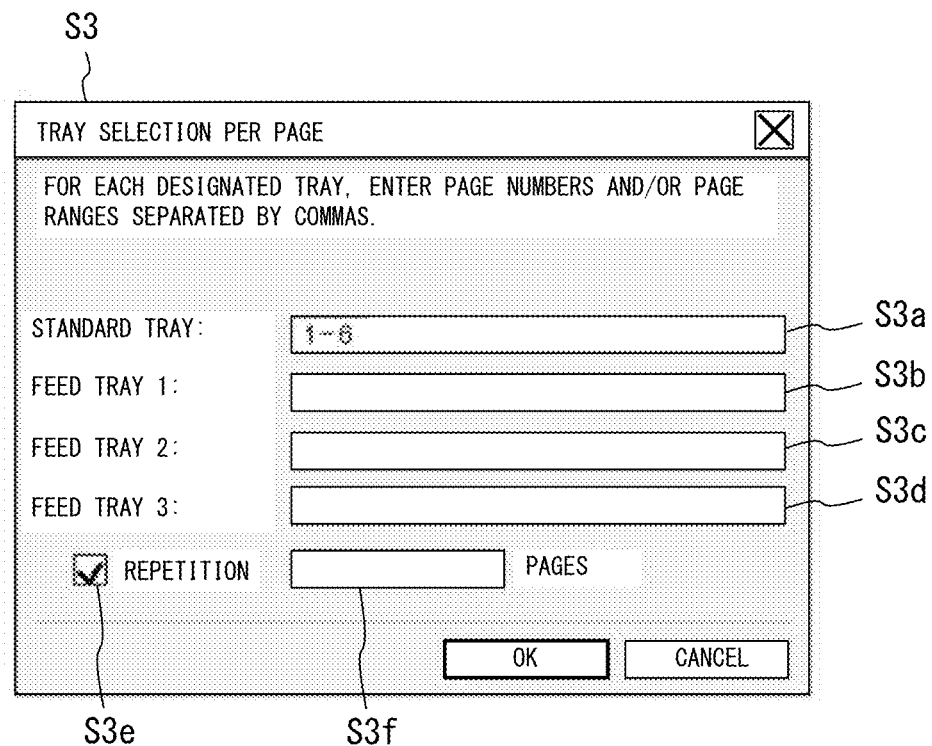
FIG. 6 is an example (Part 1) of a tray selection window according to another embodiment.
Figure 7:
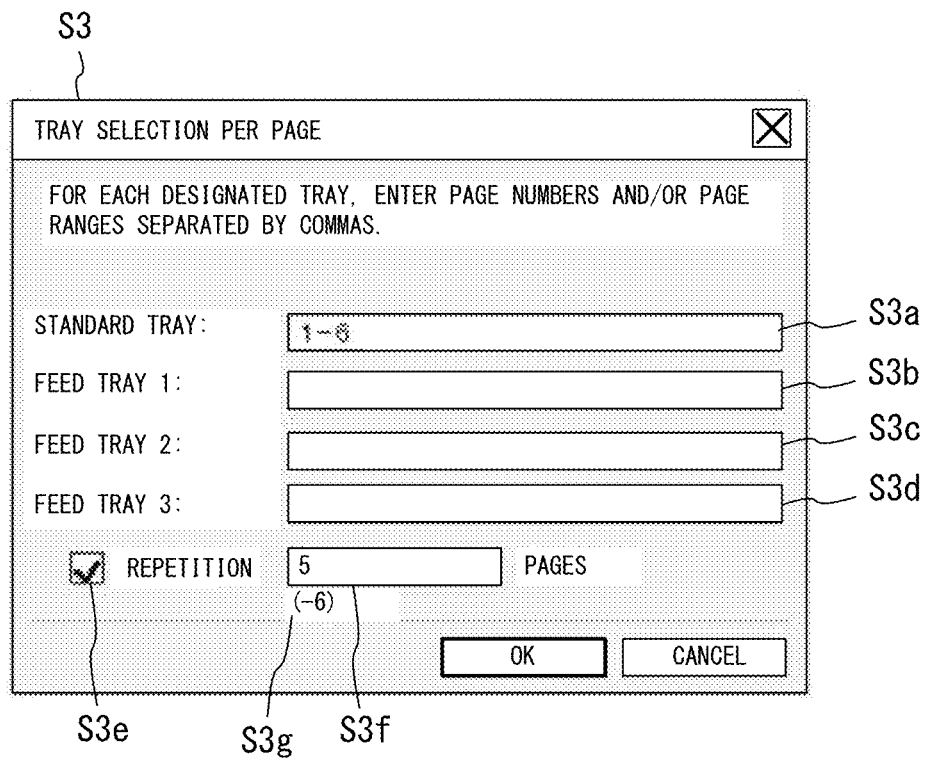
FIG. 7 is an example (Part 2) of a tray selection window according to another embodiment.

FIG. 6 and FIG. 7 are examples of the tray selection window S3 according to another embodiment.

For the present embodiment, only matters that differ from the embodiment described above will be explained.

The tray selection window S3 in FIG. 6 is provided with a standard tray page number input field S3a, a tray 1 page number input field S3b, a tray 2 page number input field S3c, a tray 3 page number input field S3d, and a repeat setting check box S3e that are similar to the standard tray page number input field S2a, the tray 1 page number input field S2b, the tray 2 page number input field S2c, the tray 3 page number input field S2d, and the repeat setting check box S2e of the tray selection window S2 in FIGS. 4A through 4C. In addition, the tray selection window S3 is further provided with a number of pages for repetition input field S3f located where "Repeat Every . . . Pages" is displayed.

The number of pages for repetition input field S3f is for receiving the designation of the page range (A that is the largest value of the page numbers described above), and the repetition application unit 12 regards the number of pages for repetition that is input in the number of pages for repetition input field S3f and is received by the selection reception unit 11 as a cycle pattern, not the largest page number input in the standard tray page number input field S3a, the tray 1 page number input field S3b, the tray 2 page number input field S3c, and the tray 3 page number input field S3d, and repeatedly applies the cycle pattern to page numbers beyond the page range as described above. The initial display value of the number of pages for repetition input field S3f when the repeat setting check box S3e is checked may be left blank, or it may be the largest value of the values entered in the input fields S3a, S3b, S3c, S3d.

As illustrated in FIG. 6, if pages 1-6 are entered only in the standard tray page number entry field S3a, page 6 automatically becomes the cycle pattern in the example of the tray selection window S2 in FIGS. 4A through 4C, but pages 7 and beyond may be input in the repeat page number input field S3f. In this case, since no tray is selected for page 7 and beyond, for the tray corresponding to pages 7 beyond, a predetermined setting (the default setting selected when printing is performed without specifying a tray) may be followed.

In addition, as illustrated in FIG. 7, in the case in which pages 1-6 are entered only in the standard tray page number input field S3a, and any number of pages that is equal to or larger than 6 is not input in the repeat page number input field S3f (for example, when page number 5 or smaller which is smaller than the page range for which the tray has been selected (for example, page 5) is input, when a character other than a number is input, or when no input is made), it is preferable that the display control unit 13 notifies the user by displaying the repeat page number input field S3f filled in and then displays "6-" that represents the pages that may be input (page 6 and beyond) in a minimum page number display field S3g. Meanwhile, in the case in which any number of pages that is equal to or larger the page range for which the trays have been selected is not input in the repeat page number input field S3f, the display control unit 13 may inform the user by means such as displaying an error screen, or it may forcibly display the pages that may be input in the repeat page number input field S3f.

In the other embodiment described above, the same effects may be obtained for the same matters as in the one embodiment described earlier, that is, the effects such as making the selection of the medium feeding unit for each page easy.

In addition, according to the present embodiment, the selection reception unit 11 receives the designation of the number of pages for repetition according to the input in, for example, the repeat page number input field S3f, separately from the selection of the medium feeding units corresponding to page numbers, and in the case in which the number of pages in the page range received by the selection reception unit 11 is equal to or smaller than the input number of pages for repetition, the repetition application 12 regards the page range up to the number of pages for repetition including the page range received by the selection reception unit 11 as a cycle pattern and repeatedly applies the cycle pattern to the page numbers beyond the number of pages for repetition.

Accordingly, the convenience for the user is improved by making it possible to select the medium feeding units in a cycle pattern that is set arbitrarily by the user.

In the case in which the input number of pages for repetition is larger than the number of pages in the page range received by the selection reception unit 11, for a page that is beyond the page range received by the selection reception unit 11, as illustrated in the example described above, the paper feeding means (tray) that is selected in the case in which printing is performed without specifying the tray is selected as the paper feeding means (tray) for the page to form the cycle pattern.

Meanwhile, in the case in which the input number of pages is smaller than the number of pages in the page range received by the selection reception unit 11, an error message or the like is displayed to inform the user that an input error has occurred, as in illustrated in the example described above.

Meanwhile, the present invention is not limited to the above-mentioned embodiments as they are and may be embodied at the implementation stage while altering the components without departing from its gist. Also, various inventions may be formed by combining a plurality of components disclosed in the above-mentioned embodiments as appropriate. For example, all the components illustrated in the embodiments may be combined as appropriate. Such various variations and applications are of course possible without departing from the gist the invention. The invention described in the claims of the original Japanese application is appended below.

According to an aspect, the present invention relates to the following.

An information processing apparatus comprising:
   a selection reception unit configured to receive selection of a medium feeding unit corresponding to a page number from among a plurality of medium feeding units that feed a medium; and
   a repetition application unit configured to regard a page range of the page numbers received by the selection reception unit as a cycle pattern and to repeatedly apply the cycle pattern to page numbers beyond the page range, to set, as the medium feeding units corresponding the page numbers beyond the page range, the medium feeding units corresponding to the page numbers in the cycle pattern.

According to another aspect, the selection reception unit receives a repetition setting as to whether or not to repeatedly apply the cycle pattern to page numbers beyond the page range, and
   the repetition application unit repeatedly applies the cycle pattern to page numbers beyond the page range in a case in which the repetition setting is made and does not repeatedly apply the cycle pattern to page numbers beyond the page range in a case in which the repetition setting is not made.

According to another aspect, the selection reception unit receives designation of a number of pages for repetition independently from the selection of the medium feeding unit corresponding to a page number, and
   in a case in which a number of pages according to the cycle pattern is equal to or smaller than the number of pages for repetition, the repetition application unit regards a page range up to the number of pages for repetition including the page numbers in the page range received by the selection reception unit as the cycle pattern and repeatedly applies the cycle pattern to the page numbers beyond the number of pages for repetition.

According to another aspect, further comprising a display control unit configured to display a selection window for the medium feeding unit on a display unit,
   the display control unit displays, on the display unit, the medium feeding unit that has been selected and the medium feeding unit that is set by the repetition application unit in a manner in which the medium feeding unit that has been selected and the medium feeding unit that is set by the repetition application unit are distinguishable from each other.

An information processing method comprises receiving selection of a medium feeding unit corresponding to a page number from among a plurality of medium feeding units that feed a medium; and regarding a page range of the page numbers that have been received as a cycle pattern and repeatedly applying the cycle pattern to page numbers beyond the page range, to set, as the medium feeding units corresponding the page numbers beyond the page range, the medium feeding units corresponding to the page numbers in the cycle pattern.

A program causes a computer for causing a computer to execute a process, comprising: receiving selection of a medium feeding unit corresponding to a page number from among a plurality of medium feeding units that feed a medium; and regarding a page range of the page numbers that have been received as a cycle pattern and repeatedly applying the cycle pattern to page numbers beyond the page range, to set, as the medium feeding units corresponding the page numbers beyond the page range, the medium feeding units corresponding to the page numbers in the cycle pattern.

The invention claimed is:

1. An information processing apparatus comprising a processor and a memory, the processor being configured
   to receive a selection identifying the page numbers of pages in a received page range of a print job that are to be fed by each medium feeder of a plurality of medium feeders,
   wherein when the processor receives an instruction to repeat printing of the pages in the received page range of the print job, the processor is configured
      to regard the received correspondence between the page numbers and the medium feeders as a cycle pattern, and
      to repeatedly apply the cycle pattern to page numbers of the repetition of the print job so as to set the correspondence between the medium feeders and the page numbers in the repetition of the print job to be the same as the correspondence between the medium feeders and the page numbers in the page range of the print job during a first printing of the pages in the received page range.

2. The information processing apparatus according to claim 1, wherein the processor is configured
   to receive a repetition setting as to whether or not to repeatedly apply the cycle pattern to page numbers of the repetition of the print job, and
   to repeatedly apply the cycle pattern to page numbers of the repetition of the print job in a case in which the repetition setting is made and does not repeatedly apply the cycle pattern to page numbers of the repetition of the print job in a case in which the repetition setting is not made.

3. The information processing apparatus according to claim 1, wherein the processor is configured
   to receive designation of a number of pages for repetition independently from the selection identifying the page numbers, and
   in a case in which a number of pages according to the cycle pattern is equal to or smaller than the number of pages for repetition, to regard a page range up to the number of pages for repetition including the page numbers in the page range that have been received as the cycle pattern and to repeatedly apply the cycle pattern to page numbers beyond the number of pages for repetition.

4. The information processing apparatus according to claim 1, wherein the processor is configured
   to display a selection window for the selection identifying the page numbers on a display, and
   to display, on the display, the page number that has been selected and the page number that is set in a manner in which the page number that has been selected and the page number that is set are distinguishable from each other.

5. An information processing method comprising:
   receiving a selection identifying the page numbers of pages in a received page range of a print job that are to be fed by each medium feeder of a plurality of medium feeders, and
   when receiving an instruction to repeat printing of the pages in the received page range of the print job,
      regarding the received correspondence between the page numbers and the medium feeders as a cycle pattern, and
      repeatedly applying the cycle pattern to page numbers of the repetition of the print job so as to set the correspondence between the medium feeders and the page numbers in the repetition of the print job to be the same as the correspondence between the medium feeders and the page numbers in the page range of the print job during a first printing of the pages in the received page range.

6. A non-transitory storage medium storing a program for causing a computer to execute a process, comprising:
   receiving a selection identifying the page numbers of pages in a received page range of a print job that are to be fed by each medium feeder of a plurality of medium feeders; and
   when receiving an instruction to repeat printing of the pages in the received page range of the print job,
      regarding the received correspondence between the page numbers and the medium feeders as a cycle pattern, and
      repeatedly applying the cycle pattern to page numbers of the repetition of the print job so as to set the correspondence between the medium feeders and the page numbers in the repetition of the print job to be the same as the correspondence between the medium feeders and the page numbers in the page range of the print job during a first printing of the pages in the received page range.

* * * * *